United States Patent
Ye et al.

(10) Patent No.: US 10,164,823 B2
(45) Date of Patent: *Dec. 25, 2018

(54) PROTECTION METHOD AND SYSTEM FOR MULTI-DOMAIN NETWORK, AND NODE

(71) Applicant: HUAWEI TECHNOLOGIES CO., LTD., Shenzhen, Guangdong (CN)

(72) Inventors: Min Ye, Chengdu (CN); Hao Long, Madrid (ES)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/783,403

(22) Filed: Oct. 13, 2017

(65) Prior Publication Data

US 2018/0041379 A1 Feb. 8, 2018

Related U.S. Application Data

(63) Continuation of application No. 14/982,282, filed on Dec. 29, 2015, now Pat. No. 9,806,937, which is a
(Continued)

(51) Int. Cl.
*H04L 12/28* (2006.01)
*H04L 12/24* (2006.01)
(Continued)

(52) U.S. Cl.
CPC ........ *H04L 41/0654* (2013.01); *H04L 5/0053* (2013.01); *H04L 12/6418* (2013.01); *H04L 43/08* (2013.01)

(58) Field of Classification Search
CPC .................................................. H04L 41/0663
See application file for complete search history.

(56) References Cited

U.S. PATENT DOCUMENTS 6,496,476 B1 12/2002 Badt, Jr. et al.
6,775,229 B1 * 8/2004 Mo .................. H04L 47/781
370/220
(Continued)

FOREIGN PATENT DOCUMENTS

CN  1798051    7/2006
CN  101715149  5/2010
(Continued)

OTHER PUBLICATIONS

International Search Report, dated Mar. 27, 2014, in International Application No. PCT/CN2013/078506 (4 pp.).
(Continued)

*Primary Examiner* — Farah Faroul
(74) *Attorney, Agent, or Firm* — Staas & Halsey LLP

(57) ABSTRACT

In the field of network communications, a protection method for a multi-domain network, wherein the multi-domain network comprises a first domain and a second domain and the two domains are interconnected by node B and C, includes: after failure of a first link between the two nodes is detected, node C disconnects a first protection path with the first domain, connects a first sub-path of the first protection path and a path that is within a second domain to form a new protection path for bearing a service across the multi-domain network, and sending, on the first sub-path, a first failure monitoring message that carries first maintenance information to node A, where the first maintenance information is the same as second maintenance information carried in a second failure monitoring message; the second failure monitoring message is a message that is sent on the first protection path by node B to node A and is used to monitor a failure of the first protection path.

16 Claims, 7 Drawing Sheets

Related U.S. Application Data continuation of application No. PCT/CN2013/078506, filed on Jun. 29, 2013.

(51) Int. Cl.
  *H04L 12/64* (2006.01)
  *H04L 5/00* (2006.01)
  *H04L 12/26* (2006.01)

(56) References Cited

U.S. PATENT DOCUMENTS

| | | | |
|---|---|---|---|
| 7,372,803 | B2 | 5/2008 | Be Boer et al. |
| 7,512,063 | B2 * | 3/2009 | Vasseur .................. H04L 45/02 370/217 |
| 2003/0021222 | A1 * | 1/2003 | Boer ..................... H04L 12/437 370/216 |
| 2005/0249119 | A1 | 11/2005 | Elie-Dit-Cosaque et al. |
| 2005/0259589 | A1 * | 11/2005 | Rozmovits .............. H04L 1/243 370/249 |
| 2011/0019538 | A1 | 1/2011 | Ryoo et al. |
| 2011/0182186 | A1 | 7/2011 | Vigoureaux et al. |
| 2011/0229123 | A1 | 9/2011 | Li et al. |
| 2011/0243030 | A1 * | 10/2011 | Zhang .................... H04L 45/04 370/254 |
| 2012/0281523 | A1 * | 11/2012 | Huber ................. H04L 41/0663 370/217 |
| 2013/0021918 | A1 | 1/2013 | Fiorone et al. |
| 2013/0235888 | A1 | 9/2013 | Bui et al. |
| 2014/0071831 | A1 * | 3/2014 | Sinha ................. H04L 43/0882 370/241.1 |
| 2014/0185432 | A1 | 7/2014 | Liu |
| 2014/0233939 | A1 | 8/2014 | Gruman et al. |
| 2014/0334292 | A1 | 11/2014 | Chang et al. |
| 2015/0334013 | A1 | 11/2015 | Deng et al. |
| 2016/0006644 | A1 | 1/2016 | Lv et al. |

FOREIGN PATENT DOCUMENTS

| | | |
|---|---|---|
| CN | 102448095 | 5/2012 |
| CN | 102572905 | 7/2012 |
| EP | 2028768 | 2/2009 |
| EP | 2346216 | 7/2011 |
| FR | 2955224 | 7/2011 |
| WO | WO2012113444 | 8/2012 |

OTHER PUBLICATIONS

Written Opinion of the International Searching Authority, dated Mar. 27, 2014, in International Application No. PCT/CN2013/078506 (7 pp.).

Extended European Search Report, dated Jun. 10, 2016, in European Application No. 13888067.9 (6 pp.).

Notice of Allowance, dated Jun. 26, 2017, in U.S. Appl. No. 14/982,282 (10 pp.).

Series G: Transmission Systems and Media, Digital Systems and Networks, Packet Over Transport Aspects—Ethernet Over Transport Aspects, Series Y: Global Information Infrastructure, Internet Protocol Aspects and Next-Generation Networks, Internet Protocol Aspects—Transport, Ethernet linear protection switching, ITU-T G.8031/Y.1342, Telecommunication Standardization Sector of ITU, International Telecommunication Union, 2012, Geneva, Switzerland (94 pages).

U.S. Appl. No. 14/982,282, filed Dec. 29, 2015, Ye, Min et al., Huawei Technologies Co., Ltd.

* cited by examiner

PROTECTION METHOD AND SYSTEM FOR MULTI-DOMAIN NETWORK, AND NODE

CROSS-REFERENCE TO RELATED APPLICATIONS

This application is a continuation of U.S. patent application Ser. No. 14/982,282, filed on Dec. 29, 2015, which is a continuation of International Application No. PCT/CN2013/078506, filed on Jun. 29, 2013. The aforementioned patent applications are hereby incorporated by reference in their entirety.

TECHNICAL FIELD

Embodiments of the present invention relate to network communications technologies, and in particular, to a protection method and system for a multi-domain network and a node.

BACKGROUND

For a service across multiple network domains, a protection mechanism may be deployed in each of the multiple network domains to implement, in a sectionalized-protection manner, end-to-end protection for the service. To prevent a service protection failure when a single node fails, a dual-node interconnection manner is generally used between network domains. In this case, different from a traditional linear protection mechanism with a single source and a single sink, multiple source nodes and/or multiple sink nodes exist in a single protection domain.

In the current multi-domain network protection mechanism, multiple protection paths need to be configured on a protection switching node to implement protection in a multi-source and/or multi-sink manner in a single network domain. Each protection path connects to a different source and a different sink, so that protection switching can be effectively implemented for a protected service when a multi-domain network fails. This mechanism requires variations in functions of the protection switching node. However, on a service access side, a service accesses a network through a single service access node, and the service access node generally supports only the traditional single-source single-sink linear protection mechanism. Because a large number of service access nodes exist on the access side, in the current protection mechanism, a large number of service access nodes need to be reconstructed and upgraded to support protection on multiple source nodes and/or sink nodes, which causes complex device implementation and high device costs.

SUMMARY

Embodiments of the present invention provide a protection method and system for a multi-domain network, and a node, so as to solve a problem in the prior art that a large number of service access nodes need to be reconstructed and upgraded, which causes complex device implementation and high device costs.

The embodiments of the present invention use the following technical solutions:

A first aspect of the present invention provides a protection method for a multi-domain network, where the multi-domain network includes a first domain and a second domain, where the first domain and the second domain intersect at a first node and a second node; and the method includes:

after the second node detects that a first link fails, disconnecting a first protection path on the node, and connecting a first sub-path and a path that is within the second domain, uses the second node as an endpoint, and is used to bear a service; and sending, on the first sub-path, a first failure monitoring message that carries first maintenance information to a third node, where:

the first maintenance information is the same as second maintenance information carried in a second failure monitoring message; the second failure monitoring message is sent on the first protection path by the first node to the third node and is used to monitor a failure of the first protection path; the first link is a link between the first node and the second node; the service is a service that passes through the first domain and the second domain; the first protection path is formed by splicing the first sub-path and a second sub-path and is a protection path of a first working path; the first working path is a working path of the service between the first node and the third node within the first domain; the first sub-path is a path between the second node and the third node; and the second sub-path is a path that passes through the first link and is between the first node and the second node.

In a first possible implementation manner, the disconnecting a first protection path on the node, and connecting a first sub-path and a path that is within the second domain, uses the second node as an endpoint, and is used to bear a service specifically includes: disconnecting the first protection path and a second protection path on the node; and connecting the first sub-path and a third sub-path, where the second protection path is formed by splicing the third sub-path and a fourth sub-path and is a protection path of a second working path; the second working path is a working path of the service between the first node and a fourth node within the second domain; the third sub-path is a path between the second node and the fourth node; and the fourth sub-path is a path between the first node and the second node.

With reference to the first aspect or the first possible implementation manner of the first aspect, in a second possible implementation manner, the second maintenance information includes an identifier of a maintenance entity group to which a maintenance endpoint of the first protection path belongs, a maintenance entity group endpoint identifier of a maintenance endpoint of the first protection path on the first node, and a maintenance entity group endpoint identifier of a maintenance endpoint of the first protection path on the third node.

With reference to the first aspect or the first possible implementation manner of the first aspect, in a third possible implementation manner, the second maintenance information includes an identifier of a maintenance association to which a maintenance endpoint of the first protection path belongs, a maintenance association endpoint identifier of a maintenance endpoint of the first protection path on the first node, and a maintenance association endpoint identifier of a maintenance endpoint of the first protection path on the third node.

With reference to the first aspect or the first possible implementation manner of the first aspect, in a fourth possible implementation manner, the second maintenance information includes a trail trace identifier of tandem connection monitoring on the first protection path.

With reference to the first aspect, or the first possible implementation manner, the second possible implementation manner, the third possible implementation manner, or the fourth possible implementation manner of the first aspect, in a fifth possible implementation manner, the method further includes: before the second node detects that the first link fails, forwarding, by the second node, the received second failure monitoring message to the third node, and recording the second maintenance information carried in the received second failure monitoring message.

With reference to the first aspect or any one of the first possible implementation manner to the fifth possible implementation manner of the first aspect, in a sixth possible implementation manner, the method further includes: before the second node detects that the first link fails, forwarding, by the second node, received second automatic protection switching information to the third node, where the second automatic protection switching information is information sent on the first protection path by the first node to the third node; and after the second node detects that the first link fails, sending, on the first protection path, first automatic protection switching information to the third node.

With reference to the sixth possible implementation manner of the first aspect, in a seventh possible implementation manner, the method further includes: before the second node detects that the first link fails, forwarding, by the second node, a received third automatic protection switching message to the first node, and maintaining a protection switching state machine according to the third automatic protection switching message, where the third automatic protection switching message is information sent on the first protection path by the third node to the first node; and after the second node detects that the first link fails, stopping, by the second node, forwarding the third automatic protection switching message.

With reference to the sixth possible implementation manner or the seventh possible implementation manner of the first aspect, in an eighth possible implementation manner, the method further includes: after the second node detects that the first link fails, when the third automatic protection switching information that is sent by the third node and requests switching to the first protection path is received, sending, by the second node, a notification message to the second domain, where the notification message is used to instruct that the second node is to be used to connect the first domain and the second domain.

With reference to the first aspect or any one of the first possible implementation manner to the eighth possible implementation manner of the first aspect, in a ninth possible implementation manner, the method further includes: before the second node detects that the first link fails, forwarding, by the second node, a received third failure monitoring message to the first node, and monitoring a failure of the first sub-path according to the third failure monitoring message, where the third failure monitoring message is a message that is sent on the first protection path by the third node to the first node and is used to monitor the first protection path; and after the second node detects that the first link fails, stopping, by the second node, forwarding the third failure monitoring message.

A second aspect of the present invention provides a node, including: a detecting unit, a switching unit, and a processing unit, where:

the detecting unit is configured to detect a failure of a first link, where the first link is a link between a first node and the node;

the switching unit is configured to: after it is detected that the first link fails, disconnect a first protection path on the node, and connect a first sub-path and a path that is within a second domain, uses the node as an endpoint, and is used to bear a service, where the service is a service that passes through a first domain and the second domain; the first domain and the second domain intersect at the first node and the node; the first protection path is formed by splicing the first sub-path and a second sub-path and is a protection path of a first working path; the first working path is a working path of the service between the first node and a third node within the first domain; the first sub-path is a path between the node and the third node; and the second sub-path is a path that passes through the first link and is between the first node and the node; and the processing unit is configured to: after it is detected that the first link fails, send, on the first sub-path, a first failure monitoring message that carries first maintenance information to the third node, where the first maintenance information is the same as second maintenance information carried in a second failure monitoring message; and the second failure monitoring message is a message that is sent on the first protection path by the first node to the third node and is used to monitor a failure of the first protection path.

In a first possible implementation manner, the switching unit is specifically configured to: after it is detected that the first link fails, disconnect the first protection path and a second protection path on the node, and connect the first sub-path and a third sub-path, where the second protection path is formed by splicing the third sub-path and a fourth sub-path and is a protection path of a second working path; the second working path is a working path of the service between the first node and a fourth node within the second domain; the third sub-path is a path between the node and the fourth node; and the fourth sub-path is a path between the first node and the node.

With reference to the first possible implementation manner of the second aspect, in a second possible implementation manner, the switching unit specifically includes a first bridge, a first selector, and a control unit, where:

an output end of the first selector is connected to the first sub-path; a first input end of the first selector is connected to the second sub-path; a second input end of the first selector is connected to a second output end of the first bridge; a first output end of the first bridge is connected to the fourth sub-path; an input end of the first bridge is connected to the third sub-path; and the control unit is configured to: after it is detected that the first link fails, control the input end of the first bridge to disconnect from the first output end of the first bridge and to connect to the second output end of the first bridge, and control the output end of the first selector to disconnect from the first input end of the first selector and to connect to the second input end of the first selector.

With reference to the second possible implementation manner of the second aspect, in a third possible implementation manner, the switching unit further includes a second bridge and a second selector, where:

an input end of the second bridge is connected to the first sub-path; a first output end of the second bridge is connected to the second sub-path; a second output end of the second bridge is connected to a second input end of the second selector; a first input end of the second selector is connected to the fourth sub-path; an output end of the second selector is connected to the third sub-path; and the control unit is further configured to: after it is detected that the first link fails, control the input end of the second bridge to disconnect from the first output end of the second bridge and to connect to the second output end of the second bridge, and control the output end of the second selector to disconnect from the first input end of the second selector and to connect to the second input end of the second selector.

With reference to the second aspect, or the first possible implementation manner, the second possible implementation manner, or the third possible implementation manner of the second aspect, in a fourth possible implementation manner, the processing unit is further configured to: before it is detected that the first link fails, forward the received second failure monitoring message and second automatic protection switching information to the third node, where the second automatic protection switching information is information sent on the first protection path by the first node to the third node; and after it is detected that the first link fails, send, on the first protection path, first automatic protection switching information to the third node.

With reference to the fourth possible implementation manner of the second aspect, in a fifth possible implementation manner, the node further includes a recording unit, configured to: before it is detected that the first link fails, record the second maintenance information carried in the received second failure monitoring message.

With reference to the second aspect or any one of the first possible implementation manner to the fifth possible implementation manner of the second aspect, in a sixth possible implementation manner, the processing unit is further configured to: before it is detected that the first link fails, forward a received third automatic protection switching message to the first node, and maintain a protection switching state machine according to the third automatic protection switching message, where the third automatic protection switching message is information sent on the first protection path by the third node to the first node; and after it is detected that the first link fails, stop forwarding the third automatic protection switching message.

With reference to the sixth possible implementation manner of the second aspect, in a seventh possible implementation manner, the node further includes a notifying unit, configured to: after it is detected that the first link fails, when the third automatic protection switching information that is sent by the third node and requests switching to the first protection path is received, send a notification message to the fourth node, where the notification message is used to instruct that the node is to be used to connect the first domain and the second domain for the service.

With reference to the second aspect or any one of the first possible implementation manner to the seventh possible implementation manner of the second aspect, in an eighth possible implementation manner, the processing unit is further configured to: before it is detected that the first link fails, forward a received third failure monitoring message to the first node, and monitor a failure of the first sub-path according to the third failure monitoring message, where the third failure monitoring message is a message that is sent on the first protection path by the third node to the first node and is used to monitor the first protection path; and after it is detected that the first link fails, stop forwarding the third failure monitoring message.

With reference to the eighth possible implementation manner of the second aspect, in a ninth possible implementation manner, the processing unit specifically includes:

a third bridge, configured to: receive the third failure monitoring message and the third automatic protection switching information; and send the third failure monitoring message and the third automatic protection switching information to a first maintaining unit and a second switch;

the first maintaining unit, configured to: receive the third failure monitoring message and the third automatic protection switching information that are output by the third bridge, maintain the protection switching state machine according to the third automatic protection switching message, and monitor the failure of the first sub-path according to the third failure monitoring message; regenerate the first failure monitoring message and the first automatic protection switching information; and send the regenerated first failure monitoring message and first automatic protection switching information to a first switch;

the first switch, configured to: forward, to the third node, the received second failure monitoring message and second automatic protection switching information that are sent by the first node; before it is detected that the first link fails, forbid forwarding the first failure monitoring message and the first automatic protection switching information to the third node; and after it is detected that the first link fails, send the first failure monitoring message and the first automatic protection switching information to the third node; and the second switch, configured to: before it is detected that the first link fails, send the received third failure monitoring message and third automatic protection switching message to the first node; and after it is detected that the first link fails, stop sending the third failure monitoring message and the third automatic protection switching message.

With reference to the eighth possible implementation manner of the second aspect, in a tenth possible implementation manner, the processing unit specifically includes:

a third bridge, configured to: receive the third failure monitoring message and the third automatic protection switching information; and send the third failure monitoring message and the third automatic protection switching information to a first maintaining unit and a second maintaining unit;

the first maintaining unit, configured to: receive the third failure monitoring message and the third automatic protection switching information that are output by the third bridge, maintain the protection switching state machine according to the third automatic protection switching message, and monitor the failure of the first sub-path according to the third failure monitoring message; regenerate the first failure monitoring message and the first automatic protection switching information; and send the regenerated first failure monitoring message and first automatic protection switching information to a first switch;

the second maintaining unit, configured to: receive the third failure monitoring message and the third automatic protection switching information that are output by the third bridge, and send the third failure monitoring message and the third automatic protection switching information to a second switch; and forward, to the third node, the received second failure monitoring message and second automatic protection switching information that are sent by the first node;

the first switch, configured to: before it is detected that the first link fails, forbid forwarding the first failure monitoring message and the first automatic protection switching information to the third node; and after it is detected that the first link fails, send the first failure monitoring message and the first automatic protection switching information to the third node; and the second switch, configured to: before it is detected that the first link fails, send the received third failure monitoring message and third automatic protection switching message to the first node; and after it is detected that the first link fails, stop sending the third failure monitoring message and the third automatic protection switching message.

A third aspect of the present invention provides a protection system for a multi-domain network, where the multi-domain network includes a first domain and a second domain, where the first domain and the second domain intersect at a first node and a second node; and the system includes:

the first node, configured to send, on a first protection path, a second failure monitoring message that is used to monitor a failure of the first protection path to a third node, where the second failure monitoring message carries second maintenance information;

the second node, which is the node according to the second aspect or any one of the possible implementation manners of the second aspect; and the third node, configured to: receive the first failure monitoring message or the second failure monitoring message; and monitor the failure of the first protection path according to the first failure monitoring message or the second failure monitoring message.

According to the protection method and system for a multi-domain network and the node that are provided in the embodiments of the present invention, optimization of a protection path is implemented by means of processing only on an intersecting node, so that non-intersecting nodes can be backward compatible with a current protection mechanism, thereby reducing device complexity and costs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a protection method and system for a multi-domain network and a node. To make the technical solutions in the present invention more comprehensible, the following describes the embodiments of the present invention in detail with reference to the accompanying drawings.

It should be clear that the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
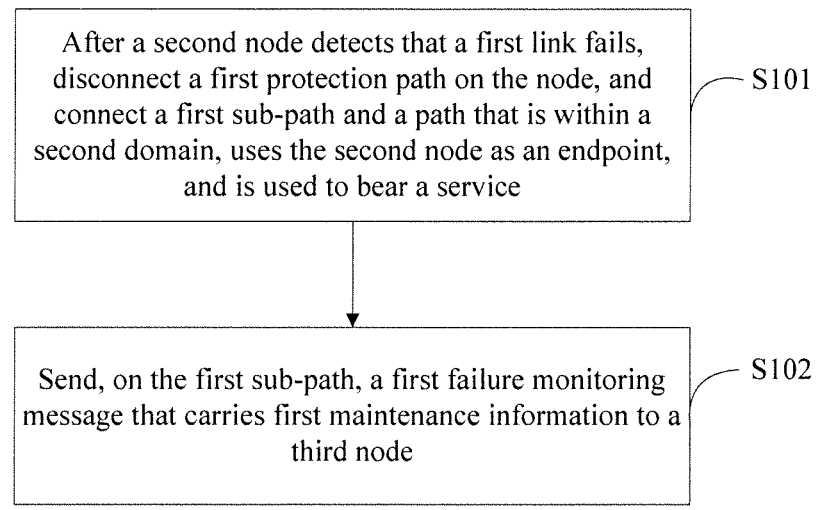
FIG. 1 is a flowchart of a protection method for a multi-domain network according to an embodiment of the present invention.

In an embodiment of the present invention, a flowchart of a protection method for a multi-domain network is shown in FIG. 1. The multi-domain network includes a first domain and a second domain, where the first domain and the second domain intersect at a first node and a second node. The method includes the following steps:

Step S101. After the second node detects that a first link fails, disconnect a first protection path on the node, and connect a first sub-path and a path that is within the second domain, uses the second node as an endpoint, and is used to bear a service.

Step S102. Send, on the first sub-path, a first failure monitoring message that carries first maintenance information to a third node.

The first maintenance information is the same as second maintenance information carried in a second failure monitoring message; the second failure monitoring message is sent on the first protection path by the first node to the third node and is used to monitor a failure of the first protection path; the first link is a link between the first node and the second node; and the service is a service that passes through the first domain and the second domain.

The first protection path is formed by splicing the first sub-path and a second sub-path and is a protection path of a first working path; the first working path is a working path that of the service between the first node and the third node within the first domain; the first sub-path is a path between the second node and the third node; the second sub-path is a path that passes through the first link and is between the first node and the second node.

Specifically, step S101 may include: disconnecting the first protection path and a second protection path on the node; and connecting the first sub-path and a third sub-path.

The second protection path is formed by splicing the third sub-path and a fourth sub-path and is a protection path of a second working path; the second working path is a working path of the service between the first node and a fourth node within the second domain; the third sub-path is a path between the second node and the fourth node; and the fourth sub-path is a path between the first node and the second node.

Specifically, the second maintenance information may include an identifier of a maintenance entity group to which a maintenance endpoint of the first protection path belongs, a maintenance entity group endpoint identifier of a maintenance endpoint of the first protection path on the first node, and a maintenance entity group endpoint identifier of a maintenance endpoint of the first protection path on the third node.

Alternatively, the second maintenance information may include an identifier of a maintenance association to which a maintenance endpoint of the first protection path belongs, a maintenance association endpoint identifier of a maintenance endpoint of the first protection path on the first node, and a maintenance association endpoint identifier of a maintenance endpoint of the first protection path on the third node.

Alternatively, the second maintenance information may include a trail trace identifier of tandem connection monitoring on the first protection path.

Further, the method may further include: before the second node detects that the first link fails, forwarding, by the second node, the received second failure monitoring message to the third node, and recording the second maintenance information carried in the received second failure monitoring message.

Further, the method may further include: before the second node detects that the first link fails, forwarding, by the second node, received second automatic protection switching information to the third node, where the second automatic protection switching information is information sent on the first protection path by the first node to the third node; and after the second node detects that the first link fails, sending, on the first protection path, first automatic protection switching information to the third node.

Further, the method may further include: before the second node detects that the first link fails, forwarding, by the second node, a received third automatic protection switching message to the first node, and maintaining a protection switching state machine according to the third automatic protection switching message, where the third automatic protection switching message is information sent on the first protection path by the third node to the first node; and after the second node detects that the first link fails, stopping, by the second node, forwarding the third automatic protection switching message.

Further, the method may further include: after the second node detects that the first link fails, when automatic protection switching information that is sent by the third node and requests switching to the first protection path is received, sending, by the second node, a notification message to the second domain, where the notification message is used to instruct that the second node is to be used to connect the first domain and the second domain.

Further, the method may further include: before the second node detects that the first link fails, forwarding, by the second node, a received third failure monitoring message to the first node, and monitoring a failure of the first sub-path according to the third failure monitoring message, where the third failure monitoring message is a message that is sent on the first protection path by the third node to the first node and is used to monitor the first protection path; and after the second node detects that the first link fails, stopping, by the second node, forwarding the third failure monitoring message.

The following describes in detail a protection method and system for a multi-domain network and a node that are provided in the embodiments of the present invention.

Figure 2:
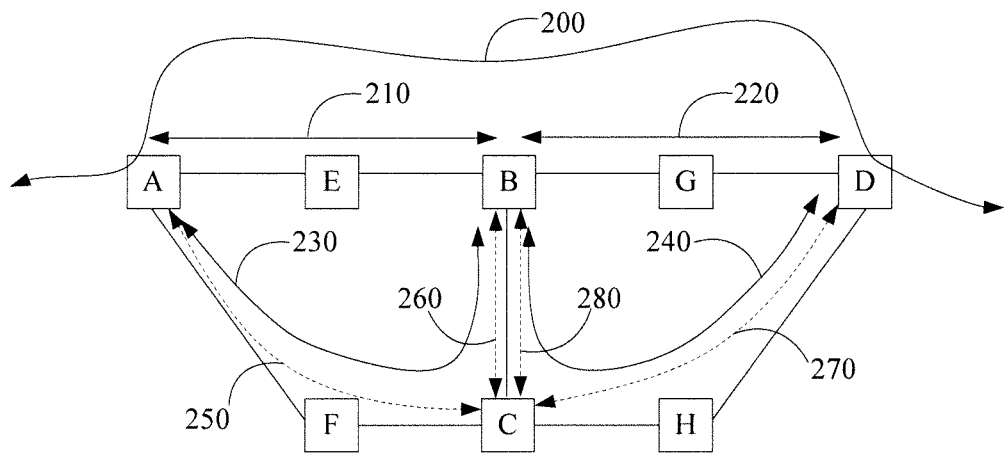
FIG. 2 is a diagram of a multi-domain network topology according to an embodiment of the present invention.

In Embodiment 1, this embodiment of the present invention provides a protection method for a multi-domain network. A topology of the multi-domain network is shown in FIG. 2. The multi-domain network includes domain 1 and domain 2. Domain 1 and domain 2 intersect at node B and node C. Node B and node C are called intersecting nodes or may be called portal nodes (Portal Node). Node A, node E, and node F are in domain 1, and node D, node G, and node H are in domain 2.

Link B-C is a link between node B and node C. Link B-C may be a direct link between node B and node C or may be a non-direct link that includes multiple link segments between node B and node C.

There may be multiple protected services across domain 1 and domain 2. In this embodiment, protected service 200 that passes through domain 1 and domain 2 is used as an example for description. In a normal condition, protected service 200 is transmitted on a working path between node A and node D.

The multi-domain network further includes four paths:

working path 210, which is a working path for protected service 200 between node A and node B within domain 1 and is used to bear protected service 200 within domain 1, where a route is A-E-B;

working path 220, which is a working path for protected service 200 between node B and node D within domain 2 and is used to bear protected service 200 within domain 2, where a route is B-G-D;

protection path 230, which is a protection path of working path 210 in domain 1 and is formed by splicing path 250 and path 260 on node C, where a route is A-F-C-B; path 250 and path 260 may be called sub-paths of protection path 230, where path 250 is a path between node A and node C, path 260 is a path that passes through link B-C and is between node C and node B, that is, an intra-portal link (Intra-Portal Link), and the splicing may be implemented by configuring a cross-connection or a forwarding entry on node C, so that the service can be transparently forwarded between path 250 and path 260; and protection path 240, which is a protection path of working path 220 in domain 2 and is formed by splicing path 270 and path 280 on node C, where a route is B-C-H-D; path 270 and path 280 may be called sub-paths of protection path 240, where path 270 is a path between node D and node C, path 280 is a path between node C and node B, that is, an intra-portal link (Intra-Portal Link), and the splicing may be implemented by configuring a cross-connection or a forwarding entry on node C, so that the service can be transparently forwarded between path 270 and path 280.

In a normal condition, protected service 200 is borne on working path 210 and working path 220, and node B serves as a gateway to implement forwarding of protected service 200 between working path 210 and working path 220, so as to implement end-to-end connection. Node B may implement the forwarding of protected service 200 between working path 210 and working path 220 by adding/dropping the service, or may implement the forwarding of the service between working path 210 and working path 220 by means of a forwarding entry or a cross-connection.

An operation in domain 1 is used as an example herein. Maintenance endpoints of protection path 230 may be configured on node A, node B, and node C; especially for node C, a maintenance endpoint configured on it is in a direction facing node A. A connection monitoring state machine and a protection switching state machine run on these maintenance endpoints. In this embodiment, a corresponding maintenance endpoint configuration may be selected according to network technologies of domain 1 and domain 2: if domain 1 is an Ethernet network, MEP (Maintenance Association End Point or Maintenance Entity Group End Point) may be configured on node A and node B; if domain 1 is a Multi-protocol Label Switching (MPLS) network, MEPs (Maintenance Entity Group End Point) may be configured on node A and node B; if domain 1 is an OTN network, TCM (Tandem Connection Monitoring) monitoring points, such as an ODUkT (Optical Data Unit of level k, Tandem connection sub-layer) function, may be configured on node A and node B.

The method specifically includes the following steps:

Step S201: Node B sends, on protection path 230, a failure monitoring message that is used to carry second maintenance information to node A, where the failure monitoring message may be used to monitor a failure of protection path 230.

In this embodiment, node B may select, according to the network technologies of domain 1 and domain 2, a corresponding OAM packet or overhead as the failure monitoring message for failure monitoring.

If domain 1 is an Ethernet network, an Ethernet continuity check (CC) packet may be used for failure monitoring. Node B sends, on protection path 230, a continuity check packet that carries the second maintenance information to node A, where the second maintenance information includes at least the following information:

1) an identifier of a maintenance association (Maintenance Association Identifier, MA ID) or a maintenance entity group identifier (Maintenance Entity Group Identifier, MEG ID) to which a maintenance endpoint of protection path 230 belongs, where the identifier needs to be configured to a same value on maintenance endpoints of node A and node B; and 2) a maintenance association endpoint identifier (MEP ID) or a maintenance entity group endpoint identifier (MEP ID) of a maintenance endpoint of protection path 230 on node B, where MEP IDs of the maintenance endpoints on node A and node B are different.

If domain 1 is a Multi-protocol Label Switching (Multi-Protocol Label Switching, MPLS) network, an MPLS continuity and connectivity check (CC/CV) packet may be used for failure monitoring. Node B sends, on protection path 230, a continuity and connectivity check packet that carries the second maintenance information to node A, where the second maintenance information includes at least the following information:

1) an identifier of a maintenance entity group (Maintenance Entity Group Identifier) to which a maintenance endpoint of protection path 230 belongs, where the identifier needs to be configured to a same value on maintenance endpoints of node A and node B; and 2) a maintenance entity group endpoint identifier of a maintenance endpoint of protection path 230 on node B, where MEP IDs of the maintenance endpoints on node A and node B are different.

If domain 1 is an optical transport network (OTN), a tandem connection monitoring (TCM) overhead octet may be used for failure monitoring. Tandem connection monitoring (TCM) needs to be established for monitoring protection path 230, and a trail trace identifier (TTI) of the tandem connection monitoring needs to be configured. The second maintenance information is filled in an overhead octet in a data block that is sent on protection path 230 by node B to node A, where the second maintenance information carried in the overhead octet is a trail trace identifier, and the trail trace identifier may be one of the following identifiers:

1) a source access point identifier (SAPI), that is, an access point identifier of node B;

2) a destination access point identifier (DAPI), that is, an access point identifier of node A; and 3) the source access point identifier and the destination access point identifier, that is, the access point identifier of node B and the access point identifier of node A.

Step S202: Node A receives the failure monitoring message that is sent on protection path 230 by node B, and monitors the failure of protection path 230 according to the failure monitoring message.

In this embodiment, node C may forward, to node A, the received failure monitoring message that is sent on protection path 230 by node B.

Node A receives the failure monitoring message that is sent on protection path 230 by node B and may perform determining according to a current failure monitoring mechanism; if the second maintenance information carried in the failure monitoring message is correct, determines that protection path 230 does not fail; and otherwise, if the failure monitoring message is not received or the second maintenance information carried in the received failure monitoring message is incorrect, determines that protection path 230 fails.

Step S203: After detecting that link B-C fails, node C disconnects protection path 230 on the node, and connects path 250 and a path that is within domain 2, uses node C as an endpoint, and is used to bear protected service 200.

In this embodiment, when link B-C fails, node C detects that link B-C fails. The failure of link B-C may be a failure of node B or a failure of a link between node B and node C. Node C may determine that protection path 230 does not have a protection capability any longer, disconnect protection path 230 on the node to divide it into path 250 and path 260, that is, disconnect the splicing of path 250 and path 260, and connect path 250 and a path that is within domain 2, uses node C as an endpoint, and is used to bear protected service 200, so as to reconstruct a protection path.

Specifically, node C may disconnect protection path 230 and protection path 240 on the node, and connect path 250 and path 270.

Node C disconnects the splicing of path 250 and path 260, and divides protection path 230 into path 250 and path 260; and disconnects the splicing of path 270 and path 280, and divides protection path 240 into path 270 and path 280. Path 270 is a path that is within domain 2, uses node C as an endpoint, and is used to bear protected service 200, and node C may connect path 250 and path 270.

If path 270 fails, path 280 is also a path that is within domain 2, uses node C as an endpoint, and is used to bear protected service 200, and node C may connect path 250 and path 280.

If path 280 also fails and there also exists domain 3 that intersects with domain 2 at node D and node H, path C-H is also a path that is within domain 2, uses node C as an endpoint, and is used to bear protected service 200, and node C may connect path 250 and path C-H.

Step S204: After detecting that link B-C fails, node C sends, on path 250, a failure monitoring message that carries first maintenance information to node A, where the first maintenance information is the same as the second maintenance information that is carried in the failure monitoring message sent on protection path 230 by node B to node A.

In a normal condition, node C may perform failure monitoring on link B-C. Specifically, node B may send, on link B-C, a failure monitoring message that carries maintenance information to node C, so that node C monitors a failure of link B-C, where specific content and a processing mechanism of the maintenance information are similar to those for protection path 230. It should be noted that, to implement fast failure monitoring, compared with failure detection on protection path 230, failure detection on link B-C needs to be performed in a lower maintenance domain level, a lower maintenance entity group level, or higher-order ODU TCM.

In this embodiment, node C, instead of node B, sends, to node A, the failure monitoring message that carries the first maintenance information. The first maintenance information is the same as the second maintenance information. Node C may obtain the second maintenance information in two manners:

Before detecting that link B-C fails, after receiving a failure monitoring message that is sent on protection path 230 by node B, node C may record the second maintenance information carried in the failure monitoring message.

Node C may also preconfigure the second maintenance information on node C. A corresponding maintenance endpoint configuration may be selected according to the network technologies of domain 1 and domain 2: if domain 1 is an Ethernet network, an MEP (Maintenance Association End Point or Maintenance Entity Group End Point) may be configured on node C, where for a maintenance endpoint on node C and a maintenance endpoint on node B, MA IDs or MEG IDs are the same and MEP IDs are the same; if domain 1 is an MPLS network, an MEP (Maintenance Entity Group End Point) may be configured on node C, where both MEG IDs and MEP IDs of a maintenance endpoint on node C and a maintenance endpoint on node B are the same; if domain 1 is an OTN network, a TCM monitoring point, such as an ODUkT function, may be configured on node C, where an access point identifier of node C is the same as an access point identifier of node B.

After detecting that link B-C fails, node C, instead of node B, sends a failure monitoring message that has same maintenance information, so that a protection path is reconstructed when node A is unaware of the failure. The protection path in domain 1 is switched from protection path 230 to path 250, and a newly formed protection path crosses domains on node C.

Before detecting that link B-C fails, node C does not send the failure monitoring message that carries the first maintenance information.

Step S205: Node A receives the failure monitoring message that is sent on path 250 by node C, and monitors a failure of path 250 according to the failure monitoring message.

Figure 3:
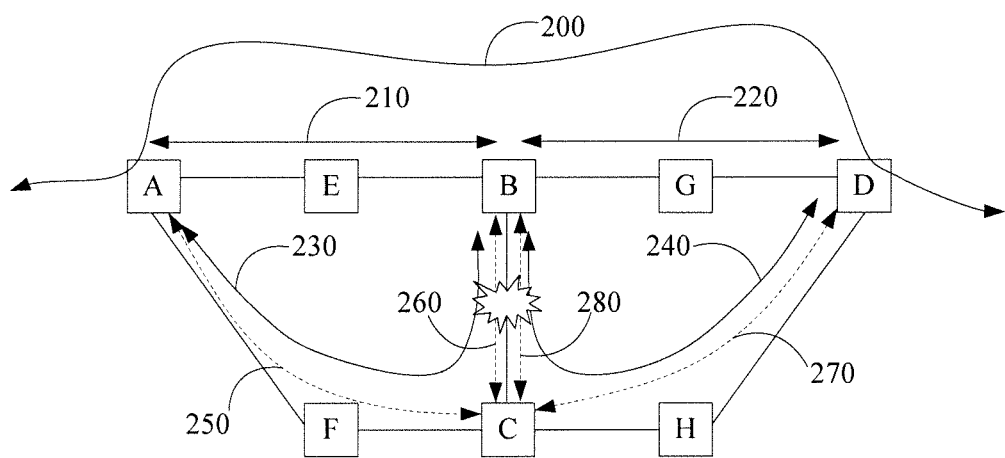
FIG. 3 is a diagram of another multi-domain network topology according to an embodiment of the present invention.

In this embodiment, as shown in FIG. 3, even if link B-C fails, after receiving the failure monitoring message that is sent by node C, node A may still acquire the first maintenance information that is the same as the second maintenance information, so that node A is unaware of the failure of link B-C, a protection path does not need to be reselected, and no switching operation needs to be performed.

In this embodiment, an execution order of step S203 and step S204 is not limited. Step S204 may be performed after step S203, and vice versa.

Further, in a normal condition, node B may further send, on protection path 230, second automatic protection switching (Automatic Protection Switching, APS) information to node A, where the second automatic protection switching information is used by node A to determine whether protection path 230 is available and to coordinate a protection switching action between node B and node A; node C forwards the received second APS information to node A; node A receives the second APS information that is sent on the protection path by node B, maintains the protection switching state machine on node A according to the second APS information, and determines whether protection path 230 is available, or determines a protection switching action for node A.

After detecting that link B-C fails, node B stops sending the second APS information and the failure monitoring message that carries the second maintenance information.

After detecting link B-C fails, node C may further send, on protection path 250, first APS information to node A, exchanges, instead of node B, the APS information with node A; node A receives the first APS information that is sent on protection path 250 by node C, and is unaware of the failure of link B-C.

Before detecting that link B-C fails, node C does not send the first APS information.

Further, node A may further send, on protection path 230, third APS information to node B; before detecting that link B-C fails, node C receives the third APS information, maintains the protection switching state machine on node C according to the third APS information, and forwards the third APS information to node B; node B receives the third APS information, maintains the protection switching state machine on node B according to the third APS information, and exchanges the APS information with node A. After detecting that link B-C fails, node C may further stop forwarding the third APS message.

Figure 4:
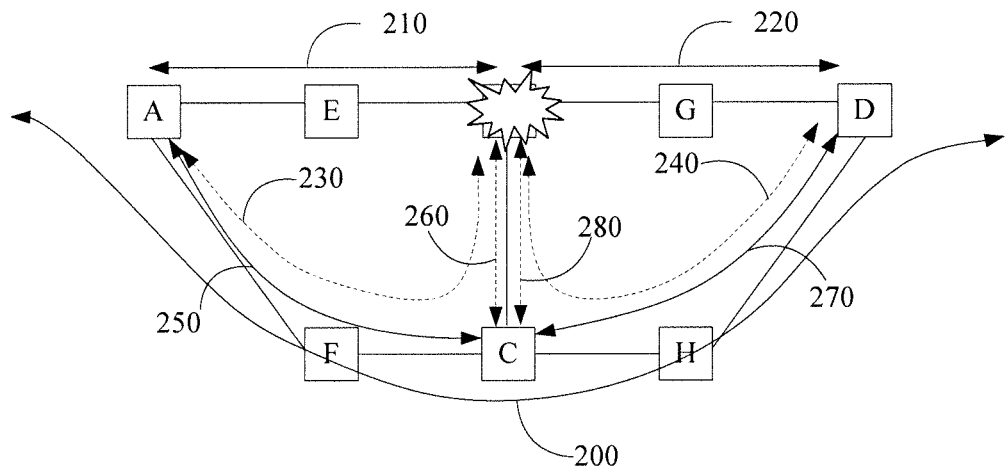
FIG. 4 is a diagram of still another multi-domain network topology according to an embodiment of the present invention.

Further, if working path 210 also fails, node A detects that working path 210 fails, determines, according to the first maintenance information, that path 250 does not fail, and switches the service from working path 210 to path 250. FIG. 4 describes a scenario in which both working path 210 and link B-C fail due to a failure of node B. Node C detects that link B-C fails, disconnects protection path 230 and protection path 240, and connects path 250 and path 270; node A detects that working path 210 fails, and switches protected service 200 to path 250.

In a normal condition, node A may perform failure monitoring on working path 210. Specifically, node B may send, on working path 210, a failure monitoring message to node A, so that node A monitors a failure of working path 210.

After working path 210 also fails, node A detects that working path 210 fails, and node A may send third APS information that requests switching to protection path 230, coordinate a protection switching action between node A and node C according to the APS information between node A and node C, and switch the service from working path 210 to path 250. The APS information may be an APS packet or an overhead.

Further, after detecting that link B-C fails, when receiving the third APS information that is sent by node A and requests switching to the protection path, node C may further send a notification message to domain 2, where the notification message instructs that node C is to be used to implement cross-domain protection on protected service 200. Specifically, the notification message may instruct that node C is to be used to connect domain 1 and domain 2.

As intersecting nodes of domain 1 and domain 2, node B and node C may have multiple physical links in between, where each link may bear one or more paths:

1) when one link B-C exists, link B-C may be an intersecting link between domain 1 and domain 2, that is, link B-C is located in both domain 1 and domain 2, and both protection path 230 and protection path 240 pass through link B-C; or 2) when multiple links exist, for example, link B-C and link B'-C' exist, link B-C may be located only in domain 1, and link B'-C' is located only in domain 2, protection path 230 passes through link B-C, and protection path 240 passes through link B'-C'.

In this embodiment, node C may send the notification message to node D in domain 2, and node D may perform corresponding protection switching for protected service 200 according to the notification message. Specifically, if path 270 does not fail, node D switches protected service 200 to path 270, and protected service 200 crosses domains on node C, so as to implement end-to-end service protection in a case in which node B fails.

Further, based on the foregoing embodiment, node A may further send, on protection path 230, a failure monitoring message that carries third maintenance information to node B; before detecting that link B-C fails, node C receives the failure monitoring message, monitors a failure of path 250 according to the failure monitoring message, and forwards the failure monitoring message to node B; node B receives the failure monitoring message, and monitors a failure of protection path 230 according to the failure monitoring message. After detecting that link B-C fails, node C stops forwarding the failure monitoring message.

Processing between node D in domain 2, and node B and node C is similar to that in the foregoing embodiment. When detecting that link B-C fails (only one link B-C exists between node B and node C) or link B'-C' fails (link B-C and link B'-C' exist between node B and node C, and protection path 240 passes through link B'-C'), node C, instead of node B, sends, on the protection path 270, a failure monitoring message to node D, where maintenance information carried in the failure monitoring message is the same as the maintenance information carried in the failure monitoring message that is sent on protection path 240 by node B to node D, so that a protection path is reconstructed when node D is unaware of the failure, and the protection path in domain 2 is switched from protection path 240 to path 270, and the newly formed protection path crosses domains on node C.

According to the protection method for a multi-domain network provided in this embodiment of the present invention, after detecting a failure of a path between intersecting nodes, an intersecting node on a protection path, instead of an intersecting node on a working path, sends a failure monitoring message, so that non-intersecting nodes are unaware of a failure of the protection path and a protection path is reconstructed. Thereby, optimization of a protection path is implemented by means of processing only on an intersecting node, and complexity of non-intersecting nodes in a multi-domain network is reduced. In addition, in a case in which a working path fails, protection switching is implemented for a cross-domain service without additional processing on non-intersecting nodes.

Figure 5:
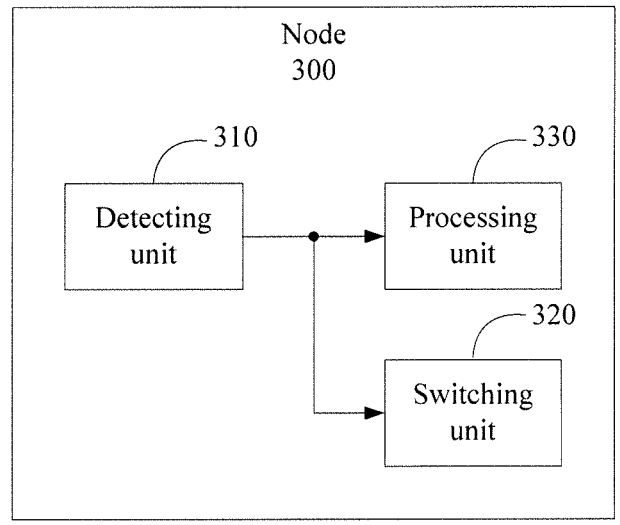
FIG. 5 is a structural block diagram of a node according to an embodiment of the present invention.

In Embodiment 2, this embodiment of the present invention provides a node. A structure of a node 300 is shown in FIG. 5, including:

a detecting unit 310, configured to detect a failure of a first link, where the first link is a link between a first node and the node;

a switching unit 320, configured to: after it is detected that the first link fails, disconnect a first protection path on the node, and connect a first sub-path and a path that is within a second domain, uses the node as an endpoint, and is used to bear a service, where:

the service is a service that passes through a first domain and the second domain; the first domain and the second domain intersect at the first node and the node; the first protection path is formed by splicing the first sub-path and a second sub-path and is a protection path of a first working path; the first working path is a working path of the service between the first node and a third node within the first domain; the first sub-path is a path between the node and the third node; and the second sub-path is a path that passes through the first link and is between the first node and the node; and a processing unit 330, configured to: after it is detected that the first link fails, send, on the first sub-path, a first failure monitoring message that carries first maintenance information to the third node, where:

the first maintenance information is the same as second maintenance information carried in a second failure monitoring message; and the second failure monitoring message is a message that is sent on the first protection path by the first node to the third node and is used to monitor a failure of the first protection path.

Further, the switching unit 320 may be specifically configured to: after it is detected that the first link fails, disconnect the first protection path and a second protection path on the node, and connect the first sub-path and a third sub-path, where:

the second protection path is formed by splicing the third sub-path and a fourth sub-path and is a protection path of a second working path; the second working path is a working path of the service between the first node and a fourth node within the second domain; the third sub-path is a path between the node and the fourth node; and the fourth sub-path is a path between the first node and the node.

In specific implementation, the first protection path and the second protection path are disconnected on the node, and then an internal switching module of the node may be implemented by using a selective bridge (Selective Bridge) and a selective selector (Selective Selector).

Figure 6A:
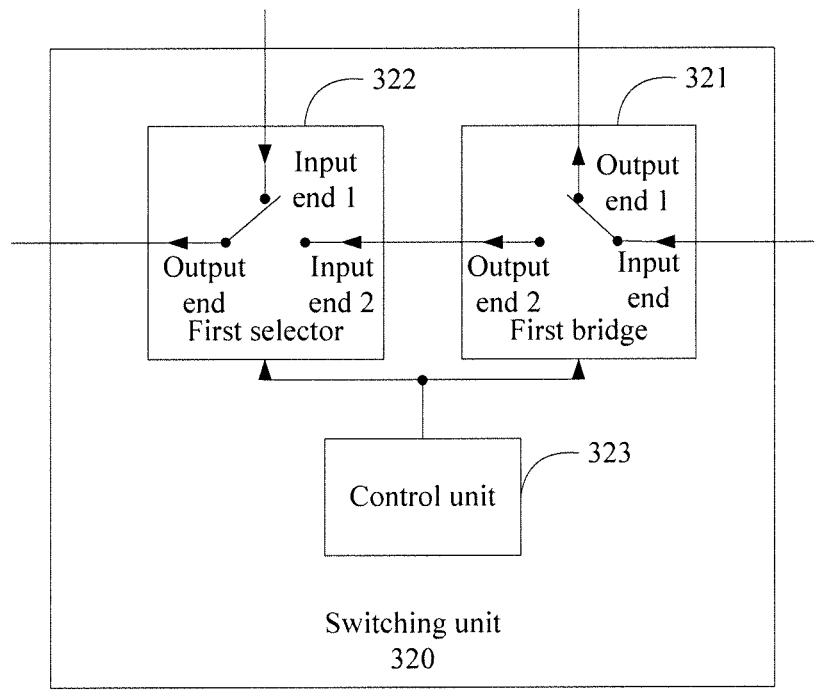
FIG. 6a is a structural block diagram of a switching unit according to an embodiment of the present invention.

Further, the switching unit 320 may specifically include a first bridge 321, a first selector 322, and a control unit 323, as shown in FIG. 6a, where:

an output end of the first selector 322 is connected to the first sub-path; input end 1 of the first selector 322 is connected to the second sub-path;

input end 2 of the first selector 322 is connected to output end 2 of the first bridge 321;

output end 1 of the first bridge 321 is connected to the fourth sub-path; an input end of the first bridge 321 is connected to the third sub-path; and the control unit 323 is configured to: after it is detected that the first link fails, control the input end of the first bridge 321 to disconnect from output end 1 of the first bridge 321 and to connect to output end 2 of the first bridge 321, and control the output end of the first selector 322 to disconnect from input end 1 of the first selector 322 and to connect to input end 2 of the first selector 322.

Figure 6B:
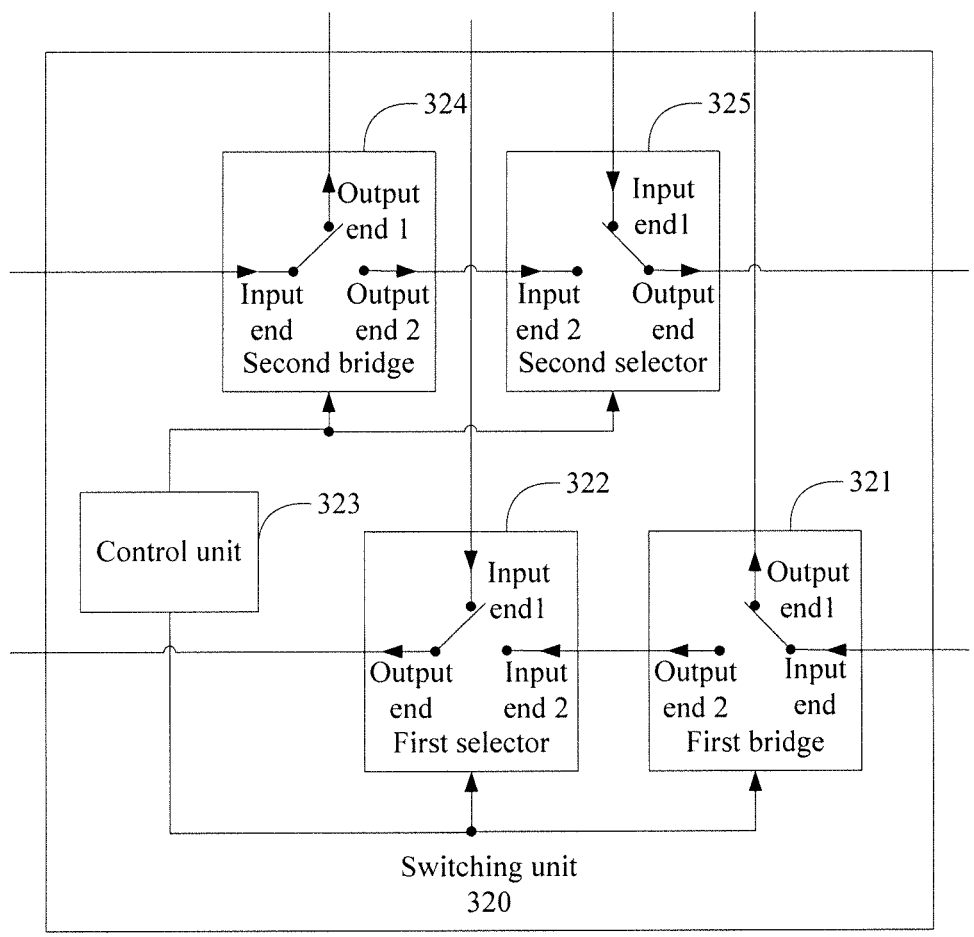
FIG. 6b is a structural block diagram of another switching unit according to an embodiment of the present invention.

Further, for a bi-directional service, the switching unit 320 may further include a second bridge 324 and a second selector 325, as shown in FIG. 6b, where:

an input end of the second bridge 324 is connected to the first sub-path; output end 1 of the second bridge 324 is connected to the second sub-path;

output end 2 of the second bridge 324 is connected to input end 2 of the second selector 325;

input end 1 of the second selector 325 is connected to the fourth sub-path; an output end of the second selector 325 is connected to the third sub-path; and the control unit 323 is further configured to: after it is detected that the first link fails, control the input end of the second bridge 324 to disconnect from output end 1 of the second bridge 324 and to connect to output end 2 of the second bridge 324, and control the output end of the second selector 325 to disconnect from input end 1 of the second selector 325 and to connect to input end 2 of the second selector 325.

Further, the processing unit 330 may be further configured to: before it is detected that the first link fails, forward the received second failure monitoring message to the third node.

Further, the processing unit 330 may be further configured to: before it is detected that the first link fails, forward received second APS information to the third node, where the second APS information is information sent on the first protection path by the first node to the third node; and after it is detected that the first link fails, send, on the first protection path, first APS information to the third node.

Further, the node may further include a recording unit 340, configured to: before it is detected that the first link fails, record the second maintenance information carried in the received second failure monitoring message.

Further, the processing unit 330 may be further configured to: before it is detected that the first link fails, forward a received third APS message to the first node, and maintain a protection switching state machine according to the third APS message, where the third APS message is information sent on the first protection path by the third node to the first node; and after it is detected that the first link fails, stop forwarding the third APS message.

Further, the node may further include a notifying unit 350, configured to: after it is detected that the first link fails, when the third APS information that is sent by the third node and requests switching to the first protection path is received, send a notification message to the fourth node, where the notification message is used to instruct that the node is to be used to connect the first domain and the second domain for the service.

Further, the processing unit 330 may be further configured to: before it is detected that the first link fails, forward a received third failure monitoring message to the first node, and monitor a failure of the first sub-path according to the third failure monitoring message, where the third failure monitoring message is a message that is sent on the first protection path by the third node to the first node and is used to monitor the first protection path; and after it is detected that the first link fails, stop forwarding the third failure monitoring message.

Specifically, the processing unit 330 may include:

a third bridge, configured to: receive the third failure monitoring message and the third automatic protection switching information; and send the third failure monitoring message and the third automatic protection switching information to a first maintaining unit and a second switch;

the first maintaining unit, configured to: receive the third failure monitoring message and the third automatic protection switching information that are output by the third bridge, maintain the protection switching state machine according to the third automatic protection switching message, and monitor the failure of the first sub-path according to the third failure monitoring message; regenerate the first failure monitoring message and the first automatic protection switching information; and send the regenerated first failure monitoring message and first automatic protection switching information to a first switch;

the first switch, configured to: forward, to the third node, the received second failure monitoring message and second automatic protection switching information that are sent by the first node; before it is detected that the first link fails, forbid forwarding the first failure monitoring message and the first automatic protection switching information to the third node; and after it is detected that the first link fails, send the first failure monitoring message and the first automatic protection switching information to the third node; and the second switch, configured to: before it is detected that the first link fails, send the received third failure monitoring message and third automatic protection switching message to the first node; and after it is detected that the first link fails, stop sending the third failure monitoring message and the third automatic protection switching message.

Figure 7A:
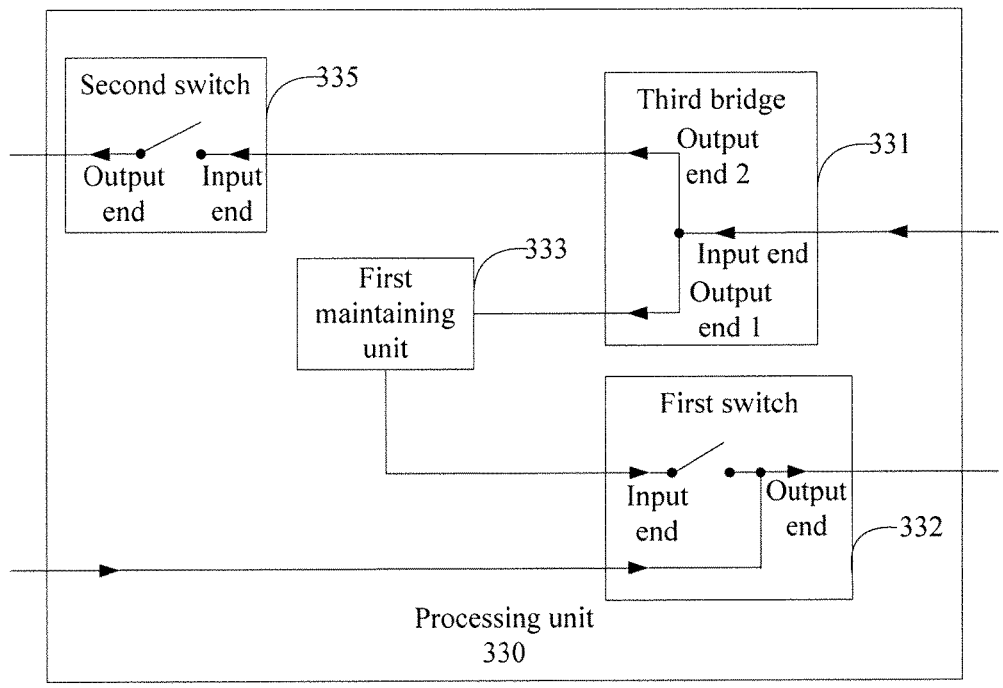
FIG. 7a is a structural block diagram of a first processing sub-unit according to an embodiment of the present invention.

As shown in FIG. 7a, the third bridge, the first maintaining unit, the first switch, and the second switch that are included in the processing unit 330 may be specifically a third bridge 331, a first maintaining unit 333, a first switch 332, and a second switch 335 in FIG. 7a.

In specific implementation, the third bridge 331 may be a permanent bridge, the first switch 332 and the second switch 335 may be single-pole, single-throw switches, and the first maintaining unit 333 may be an MEP function unit that implements an MEP-related function.

Alternatively, specifically, the processing unit 330 may include:

a third bridge, configured to: receive the third failure monitoring message and the third automatic protection switching information; and send the third failure monitoring message and the third automatic protection switching information to a first maintaining unit and a second maintaining unit;

the first maintaining unit, configured to: receive the third failure monitoring message and the third automatic protection switching information that are output by the third bridge, maintain the protection switching state machine according to the third automatic protection switching message, and monitor the failure of the first sub-path according to the third failure monitoring message; regenerate the first failure monitoring message and the first automatic protection switching information; and send the regenerated first failure monitoring message and first automatic protection switching information to a first switch;

the second maintaining unit, configured to: receive the third failure monitoring message and the third automatic protection switching information that are output by the third bridge, and send the third failure monitoring message and the third automatic protection switching information to a second switch; and forward, to the third node, the received second failure monitoring message and second automatic protection switching information that are sent by the first node;

the first switch, configured to: before it is detected that the first link fails, forbid forwarding the first failure monitoring message and the first automatic protection switching information to the third node; and after it is detected that the first link fails, send the first failure monitoring message and the first automatic protection switching information to the third node; and the second switch, configured to: before it is detected that the first link fails, send the received third failure monitoring message and third automatic protection switching message to the first node; and after it is detected that the first link fails, stop sending the third failure monitoring message and the third automatic protection switching message.

Figure 7B:
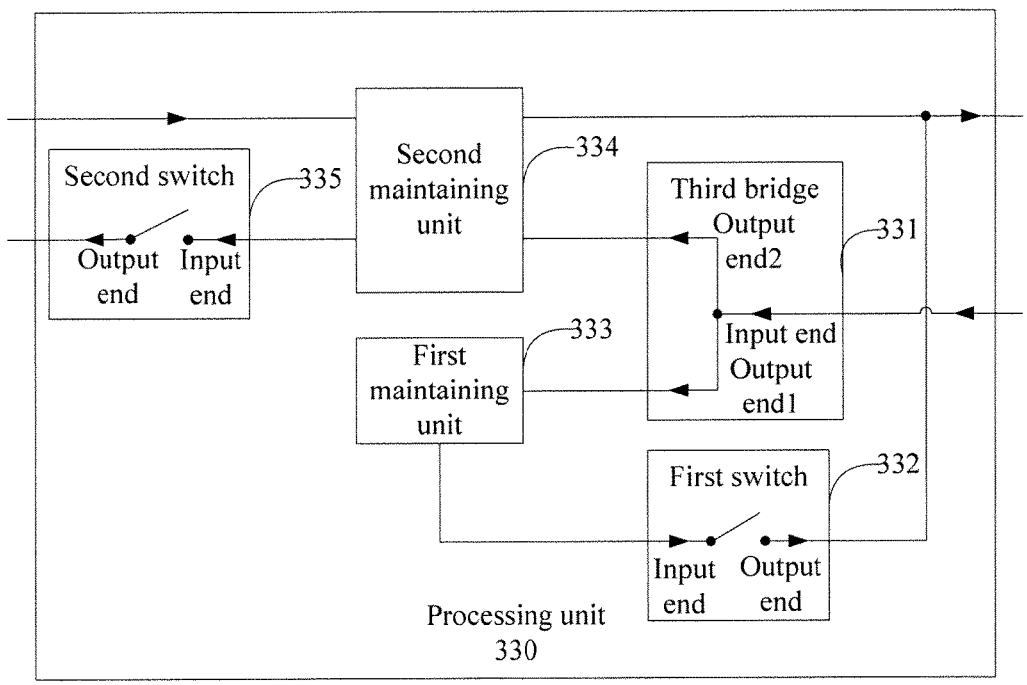
FIG. 7b is a structural block diagram of another first processing sub-unit according to an embodiment of the present invention.

As shown in FIG. 7b, the third bridge, the first maintaining unit, the second maintaining unit, the first switch, and the second switch that are included in the processing unit 330 may be specifically a third bridge 331, a first maintaining unit 333, a second maintaining unit 334, a first switch 332, and a second switch 335 in FIG. 7b.

In specific implementation, the third bridge 331 may be a permanent bridge, the first switch 332 and the second switch 335 may be single-pole, single-throw switches, the first maintaining unit 333 may be an MEP function unit that implements an MEP-related function, and the second maintaining unit 334 may be an MIP function unit that implements a function related to an MIP (MEG Intermediate Point or MA Intermediate Point, maintenance entity group intermediate point or maintenance association intermediate point).

Alternatively, specifically, the processing unit 330 may include:

a third bridge, configured to: receive the third failure monitoring message and the third automatic protection switching information; before it is detected that the first link fails, send the third failure monitoring message and the third automatic protection switching information to a second maintaining unit; and after it is detected that the first link fails, send the third failure monitoring message and the third automatic protection switching information to a first maintaining unit;

the first maintaining unit, configured to: receive the third failure monitoring message and the third automatic protection switching information that are output by the third bridge, maintain the protection switching state machine according to the third automatic protection switching message, and monitor the failure of the first sub-path according to the third failure monitoring message; regenerate the first failure monitoring message and the first automatic protection switching information; and send the regenerated first failure monitoring message and first automatic protection switching information to a first switch;

the second maintaining unit, configured to: receive the third failure monitoring message and the third automatic protection switching information that are output by the third bridge, and send the third failure monitoring message and the third automatic protection switching information to a second switch; and forward, to the third node, the received second failure monitoring message and second automatic protection switching information that are sent by the first node;

the first switch, configured to: before it is detected that the first link fails, forbid forwarding the first failure monitoring message and the first automatic protection switching information to the third node; and after it is detected that the first link fails, send the first failure monitoring message and the first automatic protection switching information to the third node; and the second switch, configured to: before it is detected that the first link fails, send the received third failure monitoring message and third automatic protection switching message to the first node; and after it is detected that the first link fails, stop sending the third failure monitoring message and the third automatic protection switching message.

Figure 7C:
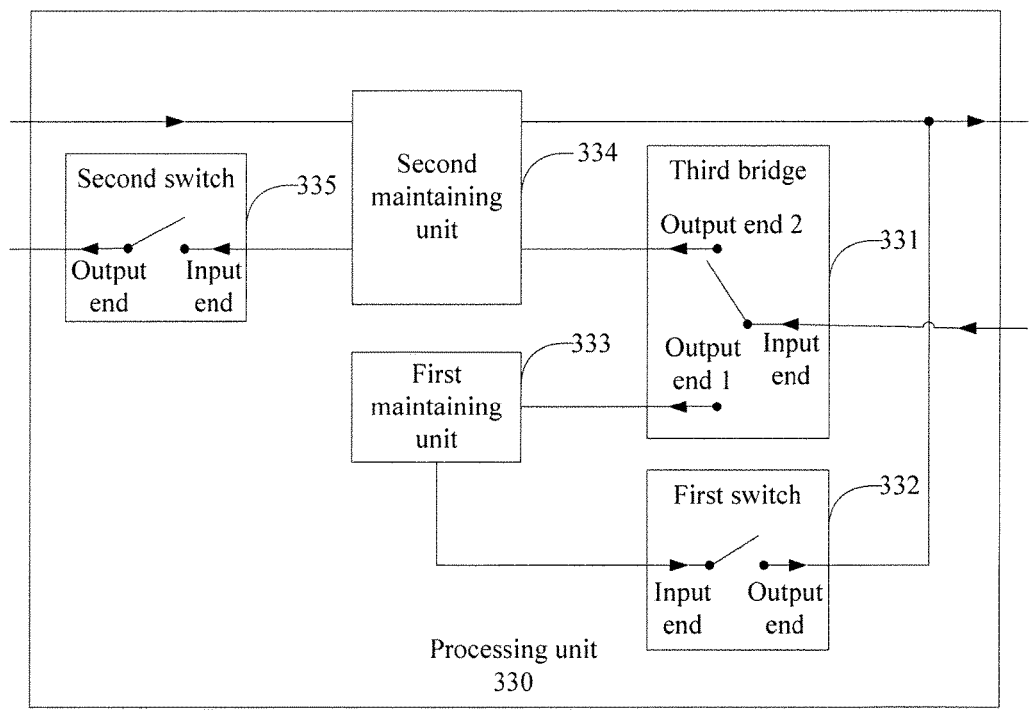
FIG. 7c is a structural block diagram of still another first processing sub-unit according to an embodiment of the present invention.

As shown in FIG. 7c, the third bridge, the first maintaining unit, the second maintaining unit, the first switch, and the second switch that are included in the processing unit 330 may be specifically a third bridge 331, a first maintaining unit 333, a second maintaining unit 334, a first switch 332, and a second switch 335 in FIG. 7c.

In specific implementation, the third bridge 331 may be a selective bridge, the first switch 332 and the second switch 335 may be single-pole, single-throw switches, and the first maintaining unit 333 may be an MEP function unit that implements an MEP-related function, and the second maintaining unit 334 may be an MIP function unit that implements an MIP-related function.

Figure 8:
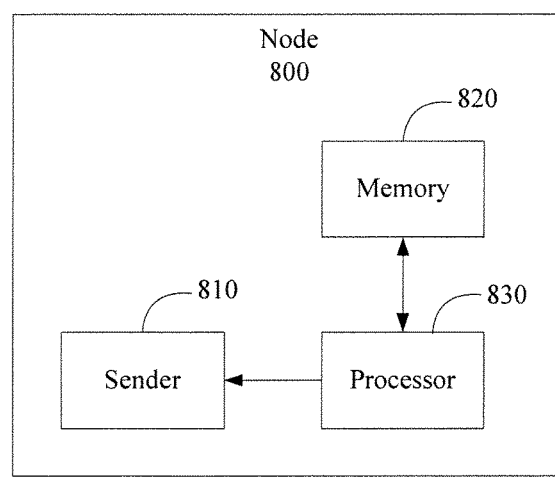
FIG. 8 is a structural block diagram of another node according to an embodiment of the present invention.

In Embodiment 3, this embodiment of the present invention provides another node. A structure of a node 800 is shown in FIG. 8, including:

a sender 810, configured to: after it is detected that a first link fails, send, on a first sub-path, a first failure monitoring message that carries first maintenance information to a third node, where:

the first link is a link between a first node and a second node; the first maintenance information is the same as second maintenance information carried in a second failure monitoring message; and the second failure monitoring message is a message that is sent on a first protection path by the first node to the third node and is used to monitor a failure of the first protection path;

a memory 820, configured to store information including a program routine; and a processor 830, coupled with the memory 820 and the sender 810 and configured to control execution of the program routine, which specifically includes:

detecting a failure of the first link; and after it is detected that the first link fails, disconnecting the first protection path on the node, and connecting the first sub-path and a path that is within a second domain, uses the node as an endpoint, and is used to bear a service, where:

the service is a service that passes through a first domain and the second domain; the first domain and the second domain intersect at the first node and the node; the first protection path is formed by splicing the first sub-path and a second sub-path and is a protection path of a first working path; the first working path is a working path of the service between the first node and the third node within the first domain; the first sub-path is a path between the node and the third node; and the second sub-path is a path that passes through the first link and is between the first node and the second node.

The node provided in this embodiment of the present invention may be a network apparatus, such as an Ethernet switch, a router, and an OTN transmission device, or may be a module in the network apparatus, which is not limited herein.

According to the node provided in this embodiment of the present invention, that is, an intersecting node on a protection path, after detecting a failure of a path between intersecting nodes, the intersecting node on the protection path, instead of an intersecting node on a working path, sends a failure monitoring message, so that non-intersecting nodes are unaware of a failure of the protection path and a protection path is reconstructed. Thereby, optimization of a protection path is implemented by means of processing only on an intersecting node, and complexity of non-intersecting nodes in a multi-domain network is reduced. In addition, in a case in which a working path fails, protection switching is implemented for a cross-domain service without additional processing on non-intersecting nodes.

For the node in the foregoing Embodiments 2 and 3, because content, such as information exchange and execution processes between its internal units, is based on a same idea as the method embodiment of the present invention, for detailed content, reference may be made to description in the method embodiment of the present invention, and details are not described herein again.

Figure 9:
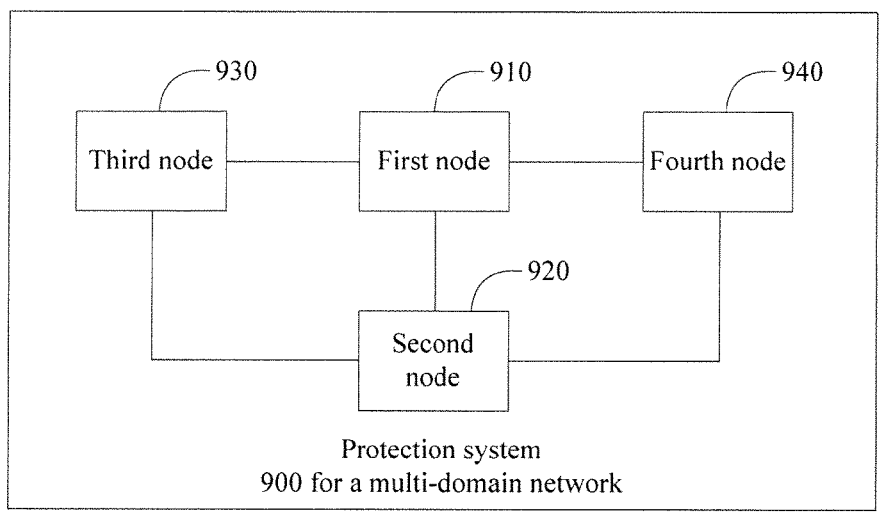
FIG. 9 is a structural block diagram of a protection system for a multi-domain network according to an embodiment of the present invention.

In Embodiment 4, this embodiment of the present invention provides a protection system for a multi-domain network. As shown in FIG. 9, a multi-domain network in which a system 900 is located includes a first domain and a second domain, where the first domain and the second domain intersect at a first node 910 and a second node 920; and the system 900 includes:

the first node 910, configured to send, on a first protection path, a second failure monitoring message that is used to monitor a failure of the first protection path to a third node 930, where the second failure monitoring message carries second maintenance information;

the second node 920, configured to: after it is detected that a first link fails, disconnect the first protection path on the node, and connect a first sub-path and a path that is within the second domain, uses the second node 920 as an endpoint, and is used to bear a service; and send, on the first sub-path, a first failure monitoring message that carries first maintenance information to the third node 930, where the first maintenance information is the same as the second maintenance information carried in the second failure monitoring message, the first link is a link between the first node 910 and the second node 920, and the service is a service that passes through the first domain and the second domain; and the first protection path is formed by splicing the first sub-path and a second sub-path and is a protection path of a first working path; the first working path is a working path of the service between the first node 910 and the third node 930 within the first domain; the first sub-path is a path between the second node 920 and the third node 930; and the second sub-path is a path that passes through the first link and is between the first node 910 and the second node 920; and the third node 930, configured to: receive the first failure monitoring message or the second failure monitoring message; and monitor the failure of the first protection path according to the first failure monitoring message or the second failure monitoring message.

Further, the disconnecting the first protection path on the node, and connecting a first sub-path and a path that is within the second domain, uses the second node 920 as an endpoint, and is used to bear a service specifically includes:

disconnecting the first protection path and a second protection path on the node; and connecting the first sub-path and a third sub-path, where:

the second protection path is formed by splicing the third sub-path and a fourth sub-path and is a protection path of a second working path; the second working path is a working path of the service between the first node 910 and a fourth node 940 within the second domain; the third sub-path is a path between the second node 920 and the fourth node 940; and the fourth sub-path is a path between the first node 910 and the second node 920.

Further, the second node 920 is further configured to: before it is detected that the first link fails, forward the received second failure monitoring message to the third node 930.

Further, the second node 920 is further configured to: before it is detected that the first link fails, record the second maintenance information carried in the received second failure monitoring message.

Further, the first node 910 is further configured to send, on the first protection path, second APS information to the third node 930; and the second node 920 is further configured to: before it is detected that the first link fails, forward the received second APS information to the third node 930; and after it is detected that the first link fails, send, on the first protection path, first APS information to the third node 930.

Further, the third node 930 is further configured to send, on the first protection path, third APS information to the first node 910; and the second node 920 is further configured to: before it is detected that the first link fails, forward the received third APS information to the first node 910, and maintain a protection switching state machine according to the third APS message; and after it is detected that the first link fails, stop forwarding the third APS information.

Further, the second node 920 is further configured to: after it is detected that the first link fails, when the third APS information that is sent by the third node 930 and requests switching to the first protection path is received, send a notification message to the second domain, where the notification message is used to instruct that the second node is to be used to connect the first domain and the second domain for the service.

Further, the third node 930 is further configured to send, on the first protection path, a third failure monitoring message that is used to monitor the first protection path to the first node 910. The second node 920 is further configured to: before it is detected that the first link fails, forward the received third failure monitoring message to the first node 910, and monitor a failure of the first sub-path according to the third failure monitoring message; and after it is detected that the first link fails, stop forwarding the third failure monitoring message. The first node 910 is further configured to receive the third failure monitoring message, and monitor the failure of the first protection path according to the third failure monitoring message.

For internal apparatus implementation of the second node 920, reference may be made to the node in Embodiment 2 or Embodiment 3, and details are not described herein again.

For the protection system for a multi-domain network in foregoing Embodiment 4, because content, such as information exchange and execution processes between its internal nodes, is based on a same idea as the method embodiment and apparatus embodiments of the present invention, for detailed content, reference may be made to description in the method embodiment and apparatus embodiments of the present invention, and details are not described herein again.

According to the protection system for a multi-domain network provided in this embodiment of the present invention, after detecting a failure of a path between intersecting nodes, an intersecting node on a protection path, instead of an intersecting node on a working path, sends a failure monitoring message, so that non-intersecting nodes are unaware of a failure of the protection path and a protection path is reconstructed. Thereby, optimization of a protection path is implemented by means of processing only on an intersecting node, and complexity of non-intersecting nodes in a multi-domain network is reduced. In addition, in a case in which a working path fails, protection switching is implemented for a cross-domain service without additional processing on non-intersecting nodes.

A person of ordinary skill in the art may understand that all or some of the steps of the method embodiments may be implemented by a computer program instructing relevant hardware. The program may be stored in a computer readable storage medium. When the program runs, the processes of the method embodiments are performed. The storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method of protection for a multi-domain network, wherein the multi-domain network comprises a first domain and a second domain, wherein the first domain and the second domain are interconnected by a first node and a second node; and the method comprising:
   detecting a failure of a first link between the first node and the second node, disconnecting, by the second node, a first protection path;
   connecting, by the second node, a first sub-path of the first protection path and a path within the second domain to construct a new protection path to bear a service which passes through the first domain and the second domain; and
   sending, by the second node, a first failure monitoring message that carries first maintenance information to a third node, wherein:
   the first maintenance information is the same as second maintenance information carried in a second failure monitoring message; the second failure monitoring message is sent on the first protection path by the first node to the third node and is used to monitor a failure of the first protection path.

2. The method according to claim 1, wherein the first maintenance information comprises an identifier of a maintenance entity group to which a maintenance endpoint of the first protection path belongs, a maintenance entity group endpoint identifier of a maintenance endpoint of the first protection path on the first node, and a maintenance entity group endpoint identifier of a maintenance endpoint of the first protection path on the third node.

3. The method according to claim 1, wherein the first maintenance information comprises an identifier of a maintenance association to which a maintenance endpoint of the first protection path belongs, a maintenance association endpoint identifier of a maintenance endpoint of the first protection path on the first node, and a maintenance association endpoint identifier of a maintenance endpoint of the first protection path on the third node.

4. The method according to claim 1, wherein the method further comprises:
   before detecting the failure of the first link, forwarding, by the second node, the received second failure monitoring message to the third node, and recording the second maintenance information carried in the received second failure monitoring message.

5. The method according to claim 1, wherein the method further comprises:
   before detecting the failure of the first link, forwarding, by the second node, received second automatic protection switching information to the third node, wherein the second automatic protection switching information is sent on the first protection path by the first node to the third node; and
   after detecting the failure of the first link, sending, on the first protection path, first automatic protection switching information to the third node.

6. The method according to claim 5, wherein the method further comprises:
   before detecting the failure of the first link, forwarding, by the second node, a received third automatic protection switching message to the first node, and maintaining a protection switching state machine according to the third automatic protection switching message, wherein the third automatic protection switching message is sent on the first protection path by the third node to the first node; and
   after detecting the failure of the first link, stopping, by the second node, forwarding the third automatic protection switching message.

7. The method according to claim 5, wherein the method further comprises:
   after detecting the failure of the first link, sending, by the second node, a notification message to the second domain, wherein the notification message is used to instruct that the second node is to be used to connect the first domain and the second domain.

8. The method according to claim 1, wherein the method further comprises:
   before detecting the failure of the first link, forwarding, by the second node, a received third failure monitoring message to the first node, and monitoring a failure of the first sub-path according to the third failure monitoring message, wherein the third failure monitoring message is a message that is sent on the first protection path by the third node to the first node and is used to monitor the first protection path; and
   after detecting the failure of the first link, stopping, by the second node, forwarding the third failure monitoring message.

9. An apparatus, comprising:
   a switch configured to:
      detect a failure of a first link between the first node and the second node, disconnect a first protection path; and
      connect a first sub-path of the first protection path and a path that is within a second domain to construct a new protection path to bear a service passes through at least two domains; and
   a transceiver configured to: send a first failure monitoring message that carries first maintenance information to the third node, wherein:
   the first maintenance information is the same as second maintenance information carried in a second failure monitoring message; and the second failure monitoring message is a message that is sent on the first protection path by the first node to the third node and is used to monitor a failure of the first protection path.

10. The apparatus according to claim 9, wherein the switch comprises a first bridge, a first selector, and a controller, wherein:
    an output end of the first selector is connected to the first sub-path; a first input end of the first selector is connected to the second sub-path;
    a second input end of the first selector is connected to a second output end of the first bridge;
    a first output end of the first bridge is connected to the fourth sub-path; an input end of the first bridge is connected to the third sub-path; and
    the controller is configured to: after detecting the failure of the first link, control the input end of the first bridge to disconnect from the first output end of the first bridge and to connect to the second output end of the first bridge, and control the output end of the first selector to disconnect from the first input end of the first selector and to connect to the second input end of the first selector.

11. The apparatus according to claim 10, wherein the switch further comprises a second bridge and a second selector, wherein:

an input end of the second bridge is connected to the first sub-path; a first output end of the second bridge is connected to the second sub-path;

a second output end of the second bridge is connected to a second input end of the second selector;

a first input end of the second selector is connected to the fourth sub-path; an output end of the second selector is connected to the third sub-path; and the controller is further configured to: after the failure of the first link is detected, control the input end of the second bridge to disconnect from the first output end of the second bridge and to connect to the second output end of the second bridge, and control the output end of the second selector to disconnect from the first input end of the second selector and to connect to the second input end of the second selector.

12. The apparatus according to claim 9, wherein the transceiver is further configured to: before detecting the failure of the first link, forward the received second failure monitoring message and second automatic protection switching information to the third node, wherein the second automatic protection switching information is sent on the first protection path by the first node to the third node; and after the failure of the first link is detected, send, on the first protection path, first automatic protection switching information to the third node.

13. The apparatus according to claim 12, wherein the apparatus further comprises a memory, configured to: before detecting the failure of the first link, store the second maintenance information carried in the received second failure monitoring message.

14. The apparatus according to claim 9, wherein the transceiver is further configured to: before detecting the failure of the first link, forward a received third automatic protection switching message to the first node; and after that the failure of the first link is detected, stop forwarding the third automatic protection switching message.

15. The apparatus according to claim 14, wherein the apparatus further comprises a transmitter, configured to: after detecting the failure of the first link, send a notification message to the fourth node, wherein the notification message is used to instruct that the second node is to be used to connect the first domain and the second domain for the service.

16. The apparatus according to claim 9, wherein the transceiver is further configured to: before detecting the failure of the first link, forward a received third failure monitoring message to the first node, and; and after the failure of the first link is detected, stop forwarding the third failure monitoring message.

* * * * *

UNITED STATES PATENT AND TRADEMARK OFFICE
CERTIFICATE OF CORRECTION

PATENT NO.         : 10,164,823 B2
APPLICATION NO.    : 15/783403
DATED              : December 25, 2018
INVENTOR(S)        : Min Ye et al.

Page 1 of 1

It is certified that error appears in the above-identified patent and that said Letters Patent is hereby corrected as shown below:

In the Claims

Column 26, Line 22:
In Claim 16, delete "node, and;" and insert -- node; --, therefor.

Signed and Sealed this
First Day of October, 2019

Andrei Iancu
*Director of the United States Patent and Trademark Office*